(12) United States Patent
Lapierre-Boire

(10) Patent No.: US 10,239,245 B2
(45) Date of Patent: Mar. 26, 2019

(54) ECONOMICAL PLASTIC TOOLING CORES FOR MOLD AND DIE SETS

(71) Applicants: A. Finkl & Sons Co., Chicago, IL (US); Sorel Forge Co., St. Joseph De Sorel (CA)

(72) Inventor: Louis Philippe Lapierre-Boire, Chambly (CA)

(73) Assignees: A. FINKL & SONS CO., Chicago, IL (US); SOREL FORGE CO., Quebec (CA)

( * ) Notice: Subject to any disclaimer, the term of this patent is extended or adjusted under 35 U.S.C. 154(b) by 192 days.

(21) Appl. No.: 14/998,669

(22) Filed: Feb. 1, 2016

(65) Prior Publication Data

US 2017/0217065 A1    Aug. 3, 2017

(51) Int. Cl.
| | |
|---|---|
| *B29C 33/38* | (2006.01) |
| *B29C 45/26* | (2006.01) |
| *B29C 33/42* | (2006.01) |
| *B29C 33/76* | (2006.01) |
| *B29L 31/00* | (2006.01) |

(52) U.S. Cl.
CPC ............. *B29C 45/26* (2013.01); *B29C 33/42* (2013.01); *B29C 33/76* (2013.01); *B29K 2905/12* (2013.01); *B29L 2031/757* (2013.01)

(58) Field of Classification Search
CPC ........................ B29C 33/38; B29C 2045/0034
See application file for complete search history.

(56) References Cited

U.S. PATENT DOCUMENTS

| | | | |
|---|---|---|---|
| 4,052,230 A | 10/1977 | Aylward | |
| 4,083,903 A | 4/1978 | Gilbert et al. | |
| 5,468,141 A | 11/1995 | Iwami et al. | |
| 5,645,794 A * | 7/1997 | Beguinot | ................ C22C 38/32 148/334 |
| 6,478,898 B1 * | 11/2002 | Sera | ......................... C21D 1/25 148/500 |
| 2003/0131911 A1 * | 7/2003 | Grimm | ..................... C21D 1/18 148/335 |

FOREIGN PATENT DOCUMENTS

| | | | | |
|---|---|---|---|---|
| JP | 2001260184 A | | 9/2001 | |
| WO | WO-2004050933 A1 * | | 6/2004 | ............. C22C 38/02 |

OTHER PUBLICATIONS

International Search Report related to Application No. EP 17165527.7 dated Mar. 27, 2018.

* cited by examiner

*Primary Examiner* — Robert B Davis
(74) *Attorney, Agent, or Firm* — Miller, Matthias & Hull LLP

(57) ABSTRACT

A blemish free surface is formed on the cavity side of a set of mold or die blocks, said set consisting of a core side and a cavity side, by use of a softer alloy on the core side as contrasted to the cavity side so that, during plastic injection molding, the core side will wear at the parting line in preference to the cavity side whereby erosion of the set occurs on the core side in preference to the cavity side leaving the cavity side erosion free.

2 Claims, 1 Drawing Sheet

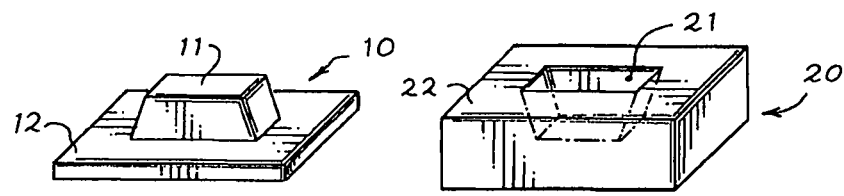
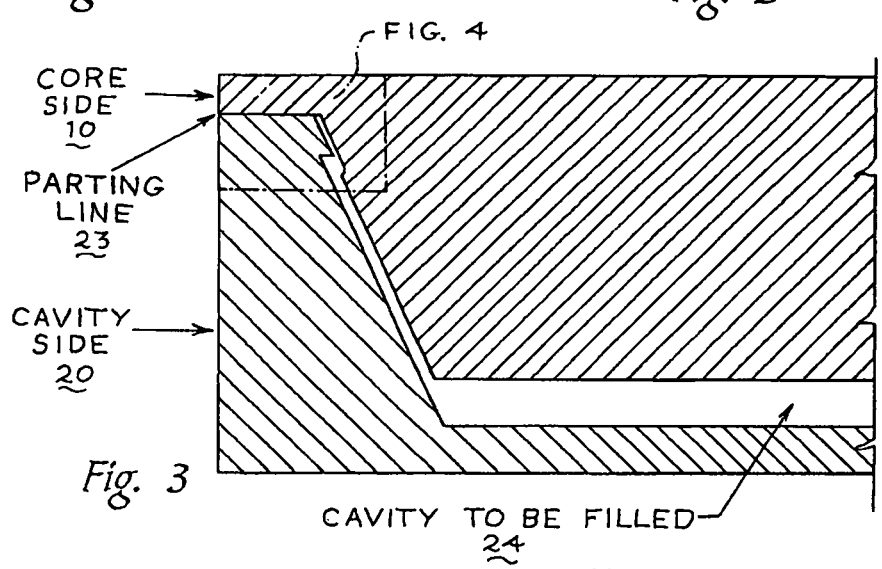
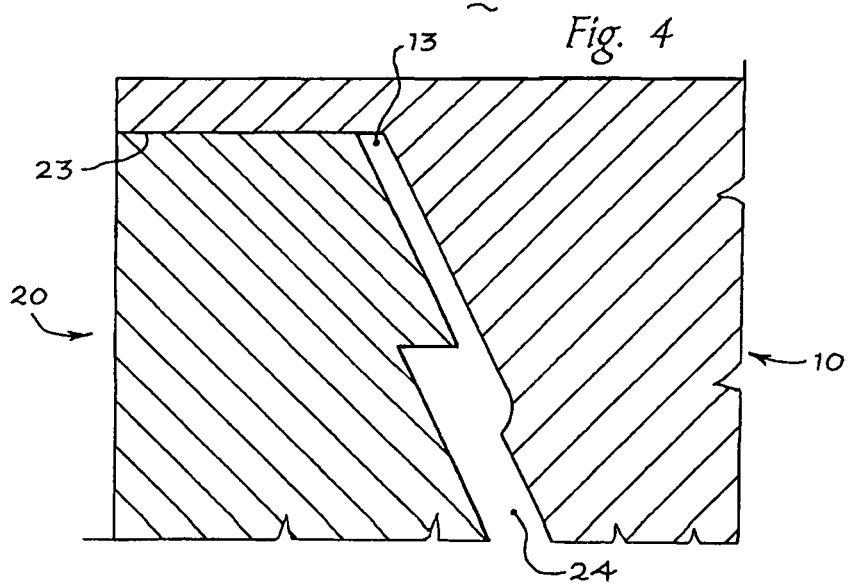

ECONOMICAL PLASTIC TOOLING CORES FOR MOLD AND DIE SETS

This invention addresses the serious problems in the plastic tooling industry pertaining to providing blemish free surfaces on mold and die components which are in molding contact with parts which are visible to the ultimate user and, also, to the continuing problem of providing mold and die materials of differing alloy compositions for the core and cavity halves for a set of plastic tooling which yield high quality final products at a very economical cost.

It has been discovered that the two halves which make up a set of plastic tooling molds or dies must have different compositions and operating characteristics to produce high quality parts at a low cost in material cross sections of about twenty inches and higher. Specifically, the cavity side of a set of plastic tooling requires, in general terms, a high quality steel to provide an ultimate blemish free surface of the molded part. By contrast, the core side of the set of tooling does not require surface finish standards as rigorous as the standards of the cavity half of the tooling set, yet must be equal to the rigorous operating conditions to which said core half is subjected.

Standard steels, such as P-20, which has the following nominal composition:

C 0.28-0.40
Mn 0.60-1.00
Si 0.20-0.80
Cr 1.40-2.00
Mo 0.30-0.55
Cu 0.25
P 0.030
S 0.030 have proven excellent in service for the cavity side of tooling sets. However, this and similar grades are uneconomical for use in the core side of tooling sets in the sense that the working attributes of such steels substantially exceed the attributes needed for the core side of tooling sets. Thus, to the part manufacturer in today's highly cost conscious environment, using the above grade for the core side of a tooling set represents an unnecessary cost over a lower cost, yet sufficiently effective alloy. Thus because tool parts are a high cost factor to the part manufacturer, a need exists for an alloy steel for the core side of plastic molding tool sets which is less expensive than the above alloy but which will perform quite satisfactorily when used in conjunction with the above alloy, particularly in tool sets of at least 20" in depth.

Of particular importance is that, after thousands of parts have been produced by a tooling set, the surface formed on the cavity of the tooling set should be as bright and blemish free as the parts made at the start of a campaign. However the steel of which the core side is made need not be capable of taking as high a polish as does the cavity side since the core side is not seen; i.e.: the core side does not require an aesthetically perfect finish.

It has been discovered that to preserve the parting line of the cavity side of the tooling set (that is, the line of separation between the two halves of the set) it is desirable to have a slightly lower hardness at the parting line of the core side of the set. Thus, when wear occurs, the flash created after injection of the plastic under pressure will not show on the cavity side of the tooling set.

In an attempt to address these problems a steel having the following composition has been used for the core side of the tooling set:

C 0.38-0.43
Mn 0.75-1.00
Si 0.15-0.30
Mo 0.15-0.25
Cr 0.80-1.10
P 0.035x
S 0.040x

However, this composition will be suitable only for cross sections of up to about 20"; above this thickness this composition will not maintain expected mechanical properties in depth. Specifically, at thickness larger than 20", this steel exhibits too much hardness drop at parting lines. This may be attributable to the mass effect upon quenching pieces over 20".

Thus, for core block steels in sections of 20" and larger in plastic injection molding tooling, a new composition is needed for the core side of plastic tooling sets which will have all the physical and mechanical properties needed for 20" and larger mold and die tooling sets but at a lower cost than materials currently available.

Accordingly a primary object of the invention is to provide a mold and die block having equal or better machinability and increased hardenability than the currently available products for the core side of plastic molding injection tooling in sections of 20" up to 35" or, more preferably, up to 30".

More specifically it is an object of this invention to provide a mold block having equal or better machinability and increased hardenability than currently available products for the core side of plastic tooling.

The invention is illustrated diagrammatically in the following Figures wherein:

FIG. 1 is a perspective view of the core side of a set of plastic tooling;

FIG. 2 is a perspective view of the cavity side of said set of plastic tooling;

FIG. 3 is a half section view of a simplified mold set; and

FIG. 4 is the partial section view 4-4 of FIG. 3 to an enlarged scale with the preferential wear area indicated in shading.

Referring first to FIG. 1, the core side of a plastic tooling set is indicated generally at 10, the core at 11 and the parting line plane at 12.

Referring next to FIG. 2, the cavity side of a plastic tooling set is indicated generally at 20, the cavity at 21 and the parting line plane at 22. It will be understood that when the core side 10 and the cavity side 20 are in molding engagement the parting line planes 12 and 22 will be in abutting engagement to form a parting line 23, see FIG. 3, and the core side 11 will be received in the cavity 21.

Since the dimensions of the core 11 are slightly smaller than the dimensions of the side cavity 21, a part will be formed in the space 24 between the core and the cavity as best seen in FIG. 4. The two halves 10 and 20 will of course be held in fixed positions when closed by suitable means well known in the industry, not shown.

Referring now specifically to FIG. 4, it will be seen that the parting line 23 forms a clear line of demarcation when the surface of the core side 10 and the surface of the cavity side 20 are in contact. When shots of molten plastic under considerable pressure are injected into the mold cavity 24, said plastic will come into contact with the surfaces of both the core side 10 and the cavity side 20. However since the core side 10 is formed from a steel which is softer than the steel of cavity side 20, said core side 10 will erode in preference to the cavity side 20. In the illustrated embodiment the eroded area in core side 10 is indicated at 13 in FIG. 4. Although the Figure indicates a uniform depth of erosion it will be understood that some locations may be softer than adjacent locations and hence the eroded space will be of irregular depth from point to point. However the steel from which core side 10 is formed is always softer than the steel from which cavity side 20 is formed and hence more erodible than the cavity steel. As a result the core side will always contain whatever flash may result after many cycles. However, since the core side surface of the molded part is not visible to the observer, the flash represented by area 13 of core side 10 is acceptable commercially.

Referring now to the core 10 only, said core of this invention has the following broad composition:

Carbon 0.25-0.55
Manganese 0.70-1.50
Silicon 0.80 max.
Chromium 1.40-2.00
Molybdenum 0.10-0.55
Aluminum 0.040 max.
Phosphorous 0.025 max.
Sulfur 0.20 max.

Within the above parameters it is preferred that the composition be as follows:

Carbon 0.30-0.50
Manganese 1.05-1.45
Silicon 0.60 max.
Chromium 1.50-2.00
Molybdenum 0.10-0.45
Aluminum 0.035 max.
Phosphorous 0.020 max.
Sulfur 0.05-0.15

A most preferred range which will give consistently excellent results is as follows.

Carbon 0.35-0.45
Manganese 1.15-1.35
Silicon 0.40 max.
Chromium 1.50-1.90
Molybdenum 0.10-0.30
Aluminum 0.030 max.
Phosphorous 0.015 max.
Sulfur 0.05-0.10

Carbon is necessary to provide the required hardness and wear resistance. If carbon is significantly higher than 0.55% the mold block will exhibit low machinability and polishing characteristics. Preferably a maximum of 0.50% carbon is used to ensure good machinability. If substantially less than 0.25% carbon is used wear resistance and mechanical properties will not be suitable for service conditions to which the mold blocks are subjected. Preferably a minimum of 0.30% carbon is used to ensure acceptable wear resistance, hardness and mechanical properties. Most preferably carbon in the range of 0.35% to 0.45% with an aim of 0.40% should be used.

Manganese is essential for hardenability and as a deoxidizer in the steelmaking process. It also acts to control sulphides in forging operations. In combination with the other alloying elements, if significantly higher than 1.50% is present there is a risk that retained austenite will be present. If substantially less than 0.70% manganese is present the hardenability of the mold block will be lessened. In addition, to ensure sulfur control the manganese content should be present in an amount of at least 20 times the sulfur content. Manganese also contributes to wear resistance, although to a lesser extent than other carbide formers. Preferably manganese will be present in the range of 1.05% to 1.45% and most preferably from 1.15% to 1.35%.

Silicon is specified for its deoxidizing ability in the steelmaking process. If present in substantially greater quantities than specified there will be a predisposition towards embrittlement of the final product.

Chromium is necessary for carbide formation, for hardenability and for wear resistance. If substantially more than the maximum of 2.00% chromium is present the hardening temperature would be too high for normal production heat treatment process. Below the specified minimum of 1.40% chromium the wear resistance will be negatively affected. Preferably, chromium is present in the amount of 1.50% to 2.00% and most preferably from 1.50% to 1.90%.

Molybdenum is a key element contributing to hardenability and wear resistance by the fact that it is a strong carbide former. Its beneficial effects are effective in the range of 0.10% to 0.55% but preferably it is maintained in the lower band of the range from 0.10% to 0.45% and most preferably in the range of 0.10% to 0.30%.

Aluminum is desirable for grain refinement but can have a detrimental effect on steel quality by causing the presence of aluminates, an undesirable impurity. It is therefore important to minimize the addition of aluminum to a maximum of 0.040% in the final melt composition. Most preferably an aim of 0.020% aluminum will achieve grain refinement.

Phosphorus could increase machinability but the detrimental effects of this element in tool steels, such as an increase in ductile-brittle transition temperature, outweigh any beneficial effects. Accordingly, the phosphorus content should not be more than the specified maximum of 0.025% and most preferably lower than 0.015%.

Sulfur is a key element for machinability and it is commonly believed that a content higher than 0.045% in tool steel will result in acceptable machinability. However, to maintain control of sulfides during processing will be necessary to avoid a content over 0.20% sulfur. Preferably sulfur should be present in the amount of 0.05% to 0.15% and most preferably in the range of 0.05% to 0.10% with an aim of 0.07%.

It is essential that the final composition be water quenched in order to achieve the required operating characteristics. However, the core and cavity sections must be produced to dissimilar hardness in order to ensure that the core side of the tooling set will have a lower hardness than the cavity side.

Thus a suitable hardness range for the cavity side would be 277-321 BHN and a suitable hardness range for the core side would be 269-277 BHN, providing that the hardness of the core side is always lower than the hardness of the cavity side. By maintaining a differential hardness between the two halves with the core half being softer than the cavity half, the parting line of the cavity is preserved; that is, the wear of the parting line of the core side is favored instead of the parting line of the cavity side. As a consequence, the bright, unblemished surface of the cavity side will be reflected in the final molded part so that minimal, or no, post molding processing of the cavity side of the part will be required.

A method of manufacturing the low alloy steel blocks for the core side of molds or dies of thickness 20 inches and larger is as follows.

A melt of steel is prepared in an electric arc furnace by:
 a. melting the bulk of the steel composition containing a majority of the alloy ingredients to produce a steel melt suitable for tapping into a receptacle,
 b. thereafter heating, alloying and refining the heat to bring the heat to its final composition,
 c. vacuum degassing, teeming and casting the heat by bottom pouring practices to form ingots,
 d. hot working the ingots to form a low alloy mold or die block, and e. thereafter heat treating the mold or die block by water quenching and tempering to form a hot work product.

It will be understood that after processing the steel in the manner described above, the hot worked product should be subjected to austenitizing at a temperature of between 800° and 900° C., quenching in water, and tempering at a temperature of between 500° and 700° C.

Following said treatment, the resultant product will exhibit a microstructure comprising mostly bainite and possibly a mixture of bainite and perlite which will be deeper than ¼ of the thickness of the block.

Although preferred and alternative embodiments of the invention have been described, it will be apparent to those skilled in the art that modifications may be made within the perimeters of the invention. Accordingly the scope of the invention should be limited only by the scope of the hereinafter appended claims when interpreted in the light of the relevant prior art.

The invention claimed is:

1. A set of plastic injection steel tooling having a core half and a cavity half in which the core half is formed of a softer steel than is the cavity half whereby wear of the parting line of the core side occurs preferentially over wear of the cavity side when flash is created after injection of plastic into the mold formed by said two halves.

2. The set of plastic injection steel tooling of claim 1 further characterized in that the range of hardness of the cavity half is 277-331 BHN and the range of hardness of the core half is 269-277, the softness of the core half always being less than the hardness of the cavity half.

* * * * *